July 29, 1952     F. M. ARCHIBALD     2,604,851
GLASS SAMPLING PUMP

Filed Dec. 23, 1948     4 Sheets-Sheet 1

Francis M. Archibald Inventor
By W. O. Hulman Attorney

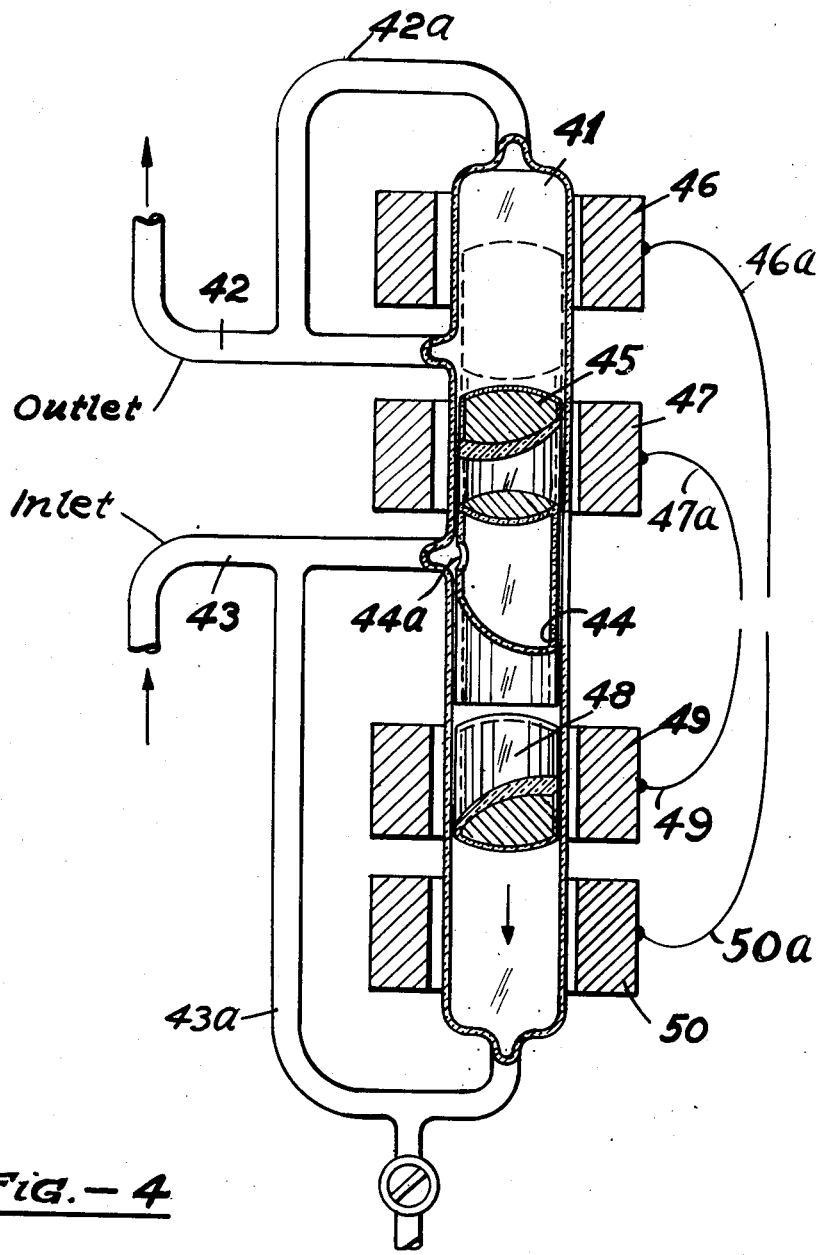

Patented July 29, 1952

2,604,851

UNITED STATES PATENT OFFICE 2,604,851

GLASS SAMPLING PUMP

Francis M. Archibald, Elizabeth, N. J., assignor to Standard Oil Development Company, a corporation of Delaware Application December 23, 1948, Serial No. 66,983

9 Claims. (Cl. 103—53)

The present invention relates to an apparatus for withdrawing and transferring fluid samples from a fluid containing system to a sample collection means. More particularly, it relates to a device of this nature provided for the continuous sampling of fluids contained in commercial process equipment and capable of operation to withdraw samples from such equipment at process temperatures and pressures.

It is an object of the invention to provide a pump-type sampling device in which pump shafts and other elements subject to leakage are omitted from the structure. It is also an object of the invention to provide apparatus employing a slide valve construction in which the necessity for check valves normally employed are eliminated, and which is positive acting at low, liquid volume flow.

The invention and its objects may be more fully understood from the following description when read in connection with the accompanying drawings, in which:

Figures 3 and 4 are similar views of other forms of the invention.

Figure 1:
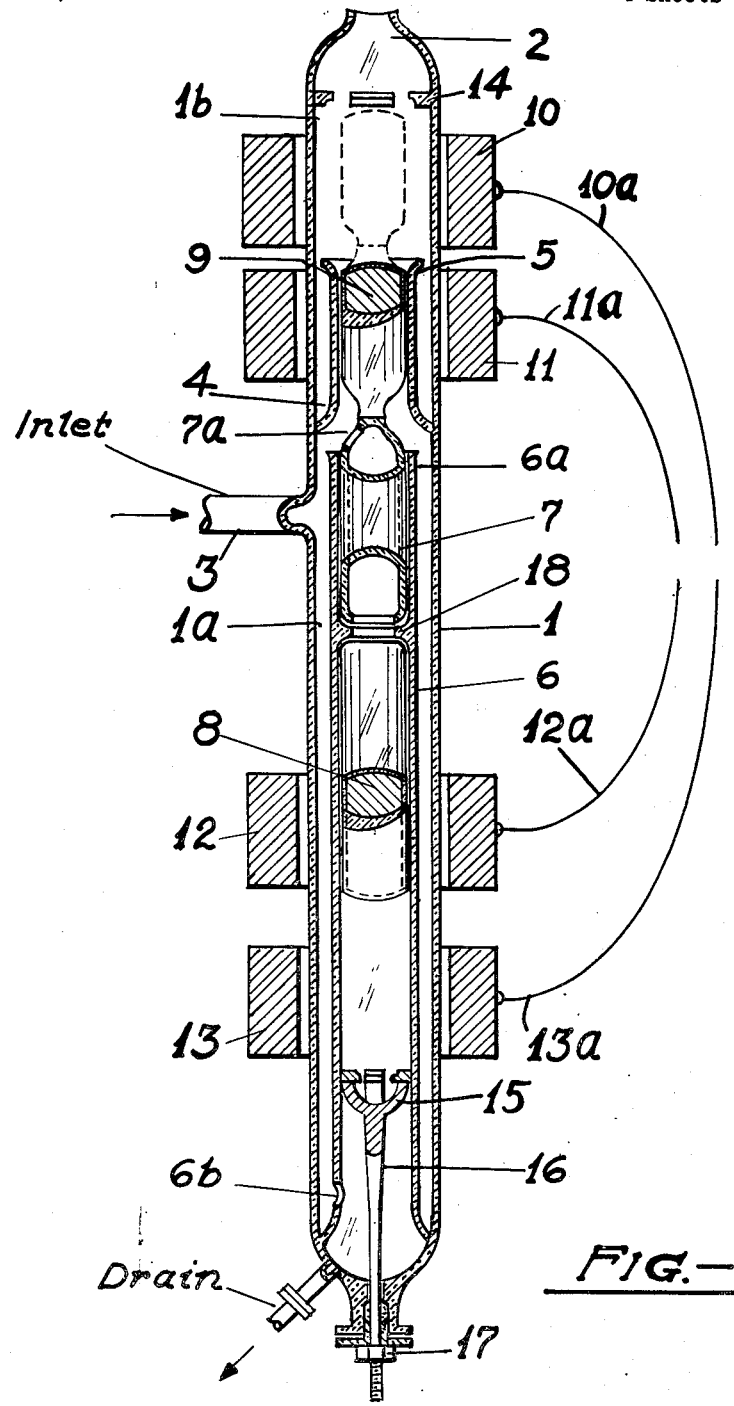
Figure 1 is a schematic illustration partly in vertical section.
Figure 2:
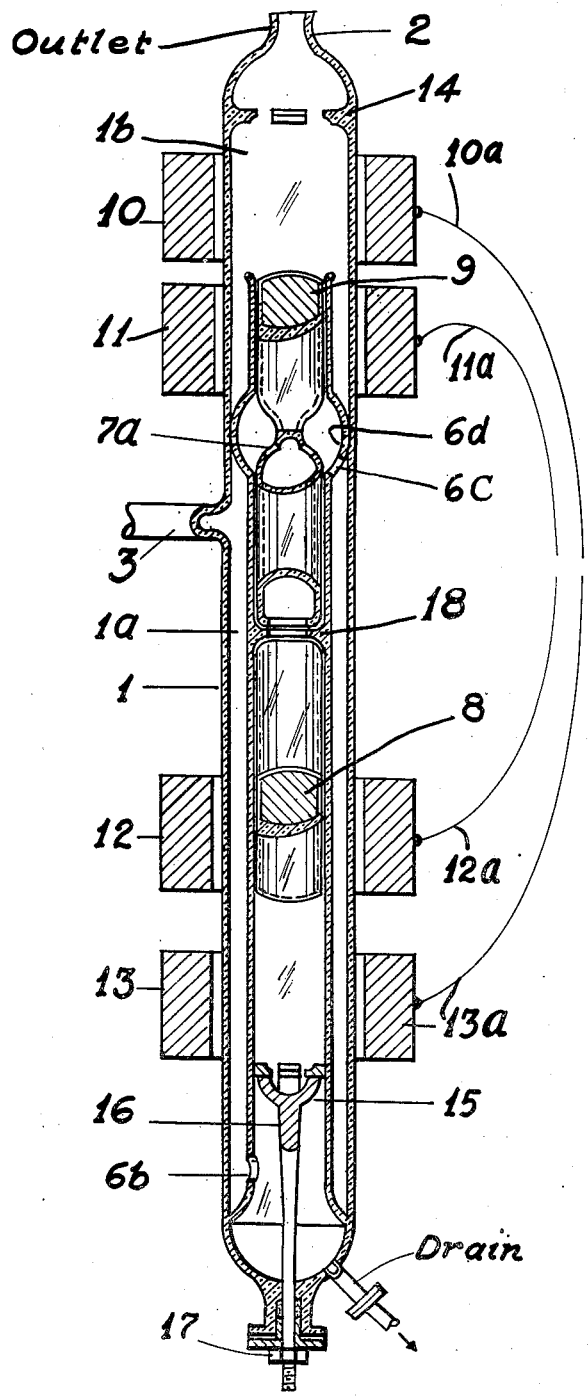
Figure 2 is a similar view of a modified form of the apparatus.

With specific reference to the drawings, in Figs. 1 and 2 the numeral 1 designates a sample receiver vessel having an outlet 2 and an inlet 3. The interior of the vessel is divided as by partition 4 into an inlet portion 1a and an outlet portion 1b. The partition 4 is annular in form and adapted to receive a hollow valve guide member 5 which, as shown, is concentric with the vessel, secured by one end in the opening of the partition 4, the other end extending freely into the outlet portion 1b of vessel 1. Within the inlet portion 1a of the vessel 1 is disposed a hollow fluid displacement element 6 having an open end 6a, coincident with the end of the valve guide 5 opening through the partition 4, but slightly spaced with relation thereto. The other end of the element 6 is perforated as at 6b for direct communication with the vessel. The element 6 is disposed within the vessel 1, with reference to the inner wall thereof, to provide a fluid receiving chamber between these two portions of the apparatus.

At the open end 6a of the element 6 is provided a hollow slide valve member 7, the outer surface of which is fitted to the inner surface of the element 6 and also to the inner surface of the element 5 so as to provide a substantially fluid-tight relationship, while permitting movement of the valve member within such bearing surfaces of the elements 5 and 6. A suitable form of slide valve member, guide 5 and displacement element 6 is made from glass or a similar material such as plastic which may be ground to provide the substantially fluid-tight fit required. It is preferred that the elements 4, 5 and 6, and the vessel 1, be made of a non-magnetic, or only slightly magnetic material. The end of the slide valve 7 entering the end portion 6a of element 6 is open to provide free communication between the interior of the valve and the interior of the displacement element. The other end of the valve is closed, but perforated to provide passageways 7a opening into the interior of the valve.

Within the displacement element 6 is provided a displacement plunger member 8 which is formed for a substantially fluid-tight fit in said element 6 and normally will be disposed intermediate the respective ends thereof. Like slide valve 7, the member 8 may be formed of glass or a similar non-magnetic material ground to provide the fit required.

As shown, the means provided for operation of the slide valve, is indicated by the numeral 9. This means is an operating plunger element joined to the perforated end of the slide valve 7, and preferably consisting of an inner core of a magnetic metal coated or covered by an inert material of the same nature as that used for the slide valve 7. The outer surfce of the element 9 is fitted as by grinding to the inner surface of the guide 5 providing a substantially fluid-tight, reciprocally movable relationship. Similarly, the plunger 8 is formed of an inner core of a magnetic material covered or coated with a non-magnetic surfacing material such as that used for the element 7 or element 9.

Exteriorly of the vessel, two pairs of electromagnetic coil elements 10 and 11, and 12 and 13, respectively, are provided with electrical connections 10a, 11a, 12a and 13a, through which an electro-magnetic force is induced in the respective coils in such fashion as to cause the magnetic cores in the elements 8 and 9 to be drawn back and forth between the coils in each of the pairs 12 and 13, and 10 and 11, respectively. Any suitable means may be provided for synchronously energizing the coils so as to provide the necessary operating sequence for the slide valve 7 and the plunger 8.

In operation, the operation of the paired coils is synchronized in such fashion that with the core 9 drawn into the area enclosed by the coil 11, the plunger 8 will be drawn into the area enclosed by the coil 13 with a slight delay between the respective reactions of the elements. In such position, the perforations in the core end of slide valve 7 will be exposed to the interior of the inlet portion 1a of vessel 1. In this position, fluid entering through inlet 3 and filling the portion 1a will flow through the perforations of the hollow slide valve under pressure of the system to completely fill the space above the plunger 8 in the displacement element 6. Upon de-energizing the coils 11 and 13, and energizing the coils 10 and 12, movement of the respective elements will be reversed drawing the core element 9 into the space defined by the coil 10, thereby exposing the perforations in the core end of the slide valve 7 in the portion 1b of the vessel 1. The corresponding movement of the plunger 8 within the displacement element 6 into the space defined by the coil 12, reduces the volume of the space between the element 6 and slide valve 7, thereby forcing fluid therefrom through the passageways 7a into the portion 1b, and therefrom through the outlet 2 into sample collection means not shown. By means of the perforations 6a in the element 6, movement of the plunger 8 is balanced by fluid entering the vessel 1 through inlet 3. The cycle thus set forth may be repeated with such frequency as required. The stroke of the plunger 8 may be varied and adjusted by providing the coil 13 for variable location with respect to the coil 12.

In the construction illustrated by Figure 2, the partition 4 is eliminated and, in substitution therefor, the element 6 is provided with an enlarged end portion 6d flared outwardly to engage the inner walls of the vessel 1 in fluid-tight relation and to provide for engagement with the valve guide member 5. As shown, the valve guide 5 and element 6 may be formed as a unit with the enlarged portion 6d of element 6 engaging the vessel walls and provide for communication with the inlet portion 1a by way of perforated passageways 6c. In operation, such structure will function in substantially the same fashion as described with reference to the structure of Figure 1.

Figure 3:
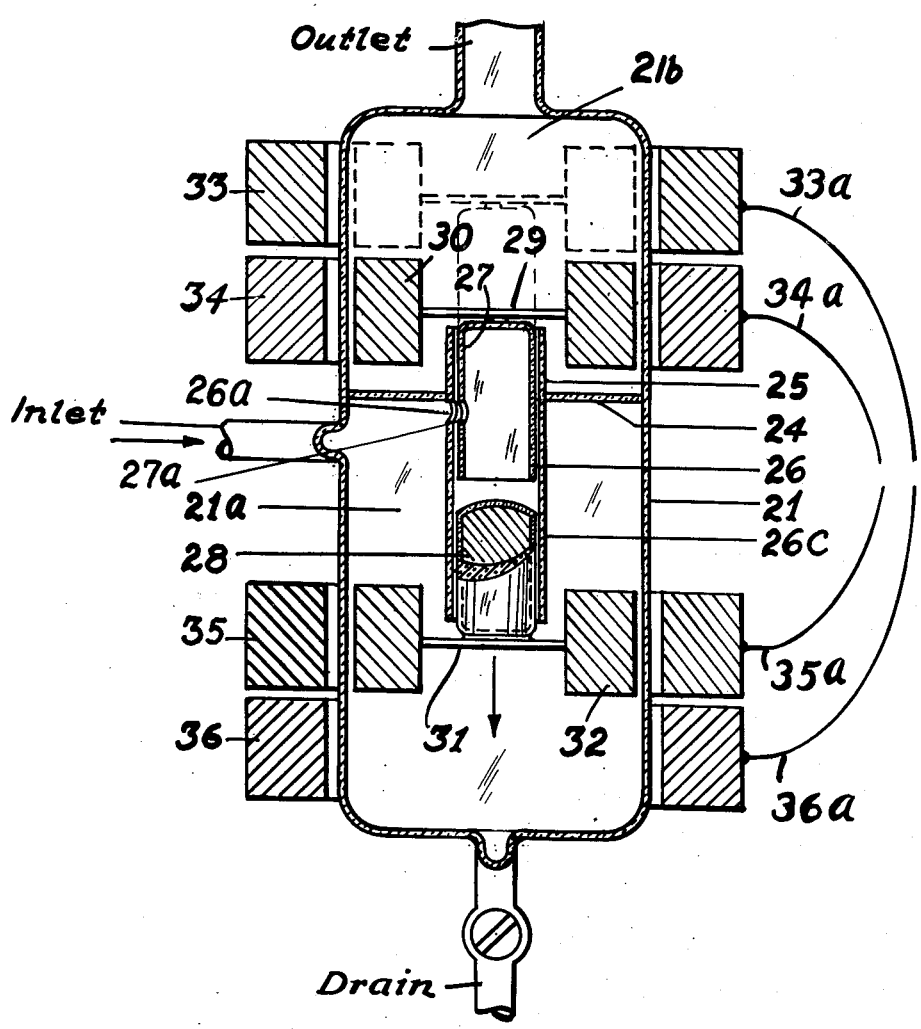

In the apparatus illustrated by Figure 3, a vessel 21 of enlarged cross section, as compared with that shown in Figures 1 and 2, is provided with an annular partition 24 dividing the interior of the vessel into inlet and outlet portions 21a and 21b respectively. Fitted in fluid-tight relation through the central opening of the annular member 24 is a displacement element 26 having a valve guide portion 25 corresponding to portion 5 in Fig. 1 and a displacement portion 26c corresponding to element 6 of Fig. 1. The displacement element 26 opens at one end into the outlet portion 21b and at the other end into the inlet portion 21a. A perforation in the wall of the element 26 adjacent the partition 24 provides a passageway 26a therethrough.

In the outlet end of the displacement element 26 is a hollow slide valve member 27 corresponding to the member 7 of Fig. 1. A passageway 27a through one wall of the element 27 is provided for registration with the passageway 26a in the element 26. One end of the slide valve is closed and the other end opens into the displacement portion 26c of the element 26, the member 27 being supported in the element 26 by means of a rod or spider 29 carried by magnetic elements 30 disposed in the outlet portion 21b of vessel 21. If desired, an annular member may be substituted for the elements 30.

At the other end of the element 26 is a plunger element 28 supported on a rod or spider 31 carried by magnetic elements 32. The elements 32 may also be replaced by an annular member.

Both the slide valve member 27 and the plunger member 28 are provided for fluid-tight relation in the element 26 and are reciprocally movable therein in substantially the same manner and for substantially the same purpose as are the elements 7 and 8 of Fig. 1. Movement of the members 27 and 28 is accomplished by means of electro-magnetic coils 33 and 34, and 35 and 36, respectively, acting upon the respective magnetic elements 30 and 32.

In the apparatus illustrated by Fig. 4, a displacement element 41 is provided with an outlet and an inlet 42 and 43 respectively, opening through a side wall portion of the element 41 in longitudinally spaced relation to each other. Balancing lines 42a and 43a communicate between the outlet and inlet lines 42 and 43 and the ends of the element 41.

Within the element 41 is provided a hollow slide valve member 44 having a passageway 44a through a side wall portion thereof adapted to register alternately with the inlet 43 and the outlet 42. A magnetic core element 45 in the hollow slide member 44 is provided for reciprocal movement of the slide valve by the action on the core 45 of an electro-magnetic force induced in the coil members 46 and 47. Beyond the open end of the slide valve 44 a plunger member 48 is provided within the vessel 41 for reciprocal movement therein in fluid-tight relation to the vessel walls. Reciprocal movement of the member 48 is accomplished by electro-magnetic coils 49 and 50. Operation of the slide valve and plunger members in the apparatus illustrated by Fig. 4 is in every way comparable to that of the similar elements 7 and 8 described in connection with Figs. 1 and 2.

In addition to electro-magnetic means for operation of the displacement plunger element in the apparatus as illustrated by the drawings, where a pressure difference exists between the inlet portion of the apparatus and the outlet portion, this pressure difference may be employed to actuate the plunger element. For example, in the form of apparatus illustrated by Fig. 1, when the system pressure is higher than that in the collection means, not shown, as where the system pressure transmitted to inlet portion 1a is above atmospheric, and that existing in outlet portion 1b is about atmospheric pressure, operation of the electro-magnetic elements 12 and 13 may be dispensed with where, as indicated in the drawing, the apparatus is provided with supplementary parts suitable for such operation.

In Fig. 1, the numeral 14 designates a stop member mounted in the outlet end of vessel 1 to limit movement of the slide valve 7 and core element toward the outlet 2. The numeral 15 designates a stop member disposed at the opposite end of the vessel 1 to limit movement of the plunger 8 in the displacement element 6. The stop member 15 is preferably provided for adjustment longitudinally of the element 6 as by threaded rod 16 and setting nut 17. If desired, a stop member 18 may also be provided in element 6 to limit movement of the elements 7 and 8 at the opposite ends of their respective paths of travel, and to prevent the slide valve 7 from passing beyond the influence of coil 11 on its associated core element 9.

When operating without employing coils 12 and 13, at the end of a displacement cycle stroke, the coil 10 is de-energized and coil 11 energized, bringing the sleeve valve 7 into telescopic relation with the open end of element 6. In this position, fluid from the system has access to the interior of element 6 through ports 7a and 6a balancing the pressure on plunger 8, which then drops by gravity against the stop 15. The coil 11 is then de-energized and coil 10 energized to draw the core member 9 into the outlet portion 1b of vessel 1, and valve 7 into guide 5 to expose ports 7a in said portion. The pressure differential between portion 1a and 1b then forces plunger 8 upwardly against the stop 18, expelling fluid above it through the ports 7a and through outlet 2. The stroke of the plunger 8 may be varied by adjusting the extension of stop 15 into element 6.

What is claimed is:

1. Apparatus for transferring fluid samples from a fluid-containing system to a separate collection means, comprising a hollow fluid displacement element, inlet means for introducing fluid into said element from the fluid-containing system and outlet means for discharging fluid from said element, a hollow slide valve member freely disposed interiorly of said element at one end thereof for reciprocal movement therein, said member having a closed end and an open end communicating directly with the interior of said element, a passageway opening through one wall of said hollow member alternately affording communication, through said hollow valve member, between the interior of said element and the respective inlet and outlet means, a displacement plunger freely disposed interiorly of said element at the other end thereof, beyond the open end of said valve member, for reciprocal movement in said element, operating means for reciprocally moving said valve member within said element alternately to permit communication through said member between said inlet and outlet means respectively and the interior of the element, and operating means for reciprocally moving said plunger within said element away from and toward the open end of said valve member to displace fluid from the element when in communication with said outlet means through the valve member passageway, reciprocal movement of said member and plunger being synchronized by said operating means for that purpose.

2. Apparatus according to claim 1, in which the means for reciprocally moving said valve member and plunger comprises a magnetic core element associated with the closed end of said member, a magnetic core element associated with said plunger, and spaced pairs of electro-magnetic coil elements encircling the receiver vessel, said coils synchronously energizable to alternately move said magnetic elements from one coil to the other in any pair and thereby the valve and plunger with which said core elements are associated.

3. Apparatus according to claim 2, in which one of the magnetic coils actuating said plunger is adjustable to vary the space relationship to the other coil in said pair and thereby vary the travel of said plunger within said displacement element.

4. Apparatus according to claim 2, in which the valve member is a hollow body of a non-magnetic material and said magnetic core element is a core of a magnetic metal sealed in the closed end thereof.

5. Apparatus for transferring fluid samples from a fluid containing system to sample collection means, comprising a receiver vessel, means dividing said vessel into an inlet portion and an outlet portion in communication with said system and collection means respectively, a hollow fluid displacement element within the vessel inlet portion, in peripherally spaced relation therein, having an open end adjoining the vessel dividing means, and an opposite end in direct communication with the vessel, a hollow valve guide opening through the vessel dividing means coincident with the open end of the displacement element and in spaced relation thereto, a hollow slide valve member reciprocally movable within and in substantially fluid-tight relation to said guide and the open end of said displacement element, said member perforated at one end and at the other end opening into said displacement element, adapted to provide alternate communication between the open end of said element and the inlet and outlet portions of the vessel, a displacement plunger disposed within said fluid displacement element in substantially fluid-tight relation thereto, and reciprocally movable intermediate the ends thereof, and operating means for reciprocally moving said slide valve member into alternate communicating relationship with said inlet and outlet portions, and for synchronous, reciprocal movement of said plunger alternately away from and toward said valve member to displace fluid from said element through said valve member when in communication with the outlet portion.

6. Apparatus according to claim 5 in which the valve guide and displacement element are formed as a unit, with an enlarged hollow portion connecting said guide and element said enlarged portion fitted to the inner surface of said receiver vessel in fluid-tight engagement therewith and dividing said vessel into an inlet portion and an outlet portion, and at least one passageway opening into said enlarged portion from the receiver vessel inlet portion.

7. Apparatus for transferring fluid samples from a fluid-containing system to a separate collection means, comprising a receiver vessel, means dividing said vessel into an inlet section and an outlet section in communication with said system and collection means respectively, a hollow fluid displacement element disposed within said vessel in peripherally spaced relation thereto, including a valve guide portion, in fluid-tight relation to said vessel dividing means, having an opening at one end of said element and portion into said vessel outlet section, and a displacement portion having openings into said vessel inlet section adjacent said vessel dividing means and also at the other end of said element and portion, a hollow slide valve member having a closed end disposed in said element valve guide portion, an open end disposed in said element displacement portion adjacent the vessel dividing means, and an open passageway through one wall of said member, said member being reciprocally movable in said portions alternately to afford communication between the interior of said displacement portion and the vessel inlet and outlet portions respectively through said valve member and passageway by way of the element displacement portion opening, adjacent the vessel dividing means, and the valve guide portion opening respectively, a displacement plunger in said element displacement portion at the other end thereof and reciprocally movable therein toward and away from the open end of said valve member, operating means for reciprocal movement of said valve member, and operating means for reciprocal movement of said plunger synchronously with said valve member to displace fluid from the element when in communication with said outlet section through said valve member and passageway.

8. Apparatus for transferring fluid from a fluid-containing system to a separate collection means, comprising a receiver vessel, an annular partition laterally of said vessel intermediate the ends thereof dividing said vessel into an inlet portion and an outlet portion in communication with said system and collection means respectively, a tubular displacement element extended through said annular partition supported therein in fluid-tight relation, said element having an outlet end and an inlet end in the respective portions of said vessel, and a passageway through one wall adjacent said partition communicating between the vessel inlet portion and the interior of said element, a hollow slide valve member freely disposed interiorly of said element at the outlet end thereof, for reciprocal movement therein, said member having a closed end normally closing the outlet end of said element, and an open end communicating directly with the interior thereof, a passageway through one wall of said member, registerable with the passageway through said element wall, alternately to afford communication, through said valve member, between the interior of said element and the respective vessel inlet and outlet portions, a displacement plunger freely disposed interiorly of said element at the inlet end thereof, for reciprocal movement therein, closing said end, operating means for reciprocally moving said valve member alternately to permit communication through said member between said vessel inlet and outlet portions and the interior of said element, and operating means for reciprocally moving said plunger away from and toward said valve member to displace fluid from the element when in communication with said outlet portion through said valve and the passageway therein, reciprocal movement of the valve member and plunger being synchronized by said operating means for that purpose.

9. Apparatus according to claim 8, in which the means for reciprocally moving each of said valve member and plunger comprises a pair of support members, one secured to the closed end of said valve member and another secured to one end portion of said plunger, each disposed exteriorly of said displacement element and extending radially outward toward the vessel walls, magnetic means carried by said support members adjacent the vessel walls, and spaced pairs of electro-magnetic coil elements encircling the vessel, said coils synchronously energizable alternately to move said magnetic means from one coil to the other in any pair, and thereby the valve and plunger with which said means are associated by means of the respective support members.

FRANCIS M. ARCHIBALD.

REFERENCES CITED

The following references are of record in the file of this patent:

UNITED STATES PATENTS

| Number | Name | Date |
|---|---|---|
| 1,925,934 | Reinstad et al. | Sept. 5, 1933 |
| 2,001,336 | Vago et al. | May 14, 1935 |
| 2,040,433 | Duffand | May 12, 1936 |